United States Patent
Visoz et al.

(10) Patent No.: US 8,412,114 B2
(45) Date of Patent: Apr. 2, 2013

(54) ADAPTIVE METHOD OF TRANSMITTING AND RECEIVING A SIGNAL IN A MULTI-ANTENNA SYSTEM, CORRESPONDING TRANSMISSION AND RECEPTION DEVICES, COMPUTER PROGRAM PRODUCTS AND SIGNAL

(75) Inventors: Raphael Visoz, Issy les Moulineaux (FR); Patricia Layec, Vanves (FR); Antoine Berthet, Chatenay Malbry (FR)

(73) Assignee: France Telecom, Paris (FR)

( * ) Notice: Subject to any disclaimer, the term of this patent is extended or adjusted under 35 U.S.C. 154(b) by 829 days.

(21) Appl. No.: 12/441,057

(22) PCT Filed: Sep. 13, 2007

(86) PCT No.: PCT/FR2007/001487
§ 371 (c)(1),
(2), (4) Date: Aug. 31, 2009

(87) PCT Pub. No.: WO2008/031951
PCT Pub. Date: Mar. 20, 2008

(65) Prior Publication Data
US 2010/0003934 A1    Jan. 7, 2010

(30) Foreign Application Priority Data

Sep. 13, 2006 (FR) .................................. 06 08021
Dec. 20, 2006 (FR) .................................. 06 11136

(51) Int. Cl.
*H04B 1/00* (2006.01)
(52) U.S. Cl. ............... 455/69; 455/115.1; 455/115.3
(58) Field of Classification Search .............. 455/69, 455/115.3, 277.1, 562.1, 422.1, 13.1, 524, 455/423, 101, 226.1, 67.11, 452.2, 450, 127.1; 370/208, 329, 229, 468, 204, 328, 207, 334, 370/238; 375/148, 150, 267, 299, 347
See application file for complete search history.

(56) References Cited

U.S. PATENT DOCUMENTS

2005/0085269 A1    4/2005    Buljore et al.
2006/0079221 A1*   4/2006    Grant et al. .................. 455/423
(Continued)

FOREIGN PATENT DOCUMENTS

| CN | 1650541 A   | 8/2005  |
|----|-------------|---------|
| WO | 0203568 A1  | 1/2002  |
| WO | 03094387 A1 | 11/2003 |

OTHER PUBLICATIONS

Chung et al: "Approaching the MIMO Capacity with a Low-Rate Feed-back Channel in V-BLAST", EURASIP Journal on Applied Signal Processing, vol. 5, 2004, pp. 762-771.

(Continued)

*Primary Examiner* — Lana N Le
*Assistant Examiner* — Golam Sorowar
(74) *Attorney, Agent, or Firm* — David D. Brush; Westman, Champlin & Kelly, P.A.

(57) ABSTRACT

A method is provided for receiving a signal, corresponding to a data signal transmitted by a transmitter to a receiver via a transmission channel. The method includes the following steps: analyzing the signal received, delivering an information item representative of the transmission channel; determining, periodically and/or as a function of a variation of the transmission channel: at least one distribution of the transmission antennas into at least one group of at least one antenna as a function of the information item representative of the transmission channel, wherein at least one group includes at least two transmission antennas for at least one of the determinations; and specific efficiencies assigned respectively to each of the groups of antennas for each distribution as a function of the information item, and transmitting to the transmitter a parameterization signal defining the at least one distribution and the specific efficiencies.

11 Claims, 4 Drawing Sheets

U.S. PATENT DOCUMENTS

| | | | |
|---|---|---|---|
| 2006/0115014 A1* | 6/2006 | Jeong et al. | 375/267 |
| 2006/0250938 A1* | 11/2006 | Khan et al. | 370/208 |
| 2006/0251156 A1* | 11/2006 | Grant et al. | 375/148 |
| 2006/0291582 A1* | 12/2006 | Walton et al. | 375/267 |
| 2007/0109954 A1* | 5/2007 | Pasanen et al. | 370/204 |

OTHER PUBLICATIONS

Ericsson: "Selective Per Antenna Rate Control (S-PARC)", Feb. 16, 2004.

French Search Report of Counterpart Appleiation No. 06/08021 Filed on Sep. 13, 2006.

International Search Report of Counterpart Application No. PCT/FR2007/001487 Filed on Sep. 13, 2007.

English Translation of the International Preliminary Report on Patentability of Counterpart Application No. PCT/FR2007/001487 Filed on Sep. 13, 2007.

English Translation of Second Chinese Office Action dated Oct. 30, 2012 for Chinese Patent Application No. 200780034088.7.

* cited by examiner

ADAPTIVE METHOD OF TRANSMITTING AND RECEIVING A SIGNAL IN A MULTI-ANTENNA SYSTEM, CORRESPONDING TRANSMISSION AND RECEPTION DEVICES, COMPUTER PROGRAM PRODUCTS AND SIGNAL

CROSS-REFERENCE TO RELATED APPLICATIONS

This Application is a Section 371 National Stage Application of International Application No. PCT/FR2007/001487, filed Sep. 13, 2007 and published as WO 2008/031951 on Mar. 20, 2008, not in English.

STATEMENT REGARDING FEDERALLY SPONSORED RESEARCH OR DEVELOPMENT

None.

The Names of Parties to a Joint Research Agreement

None.

FIELD OF THE DISCLOSURE

The field of the disclosure is that of digital communications. More precisely, the disclosure pertains to the sending and receiving of signals in the context of MIMO (Multiple-Input Multiple-Output) type multi-antenna systems.

The disclosure finds application especially in radio communications, in systems having frequency-selective transmission channels (single-carrier type systems) and frequency non-selective systems (multicarrier type systems).

In particular, the disclosure is situated at the level of the physical layer of multi-antenna mobile access networks, and can be applied to communications on uplink channels (from a terminal to a base station) as well as to communications on downlink channels (from a base station to a terminal).

BACKGROUND OF THE DISCLOSURE

The techniques for the transmission/reception of digital signals in systems comprising multiple antennas have many advantages, especially for mobile access networks. Indeed, such techniques can be used to increase a transmission bit rate, capacity or robustness for these multi-antenna systems without in any way requiring an increase in transmission power or allocated frequency bandwidth.

There also exists a known technique in the prior art used to attain open-loop capacity for frequency non-selective fading channels, assuming that there are independent Gaussian inputs. This technique relies on the implementation of an MMSE (minimum mean-square error) type receiver combined with successive interference cancellation and on the implementation of a control of rates per antennas, known as PARC (Per Antenna Rate Control) enabling the regular matching of the rate of each transmitting antenna to the capacity of the corresponding equivalent transmission channel, thus preventing a propagation of errors at the level of the interference cancellation.

It may recalled that the term "rate" conventionally refers to a choice of a modulation and encoding scheme (MCS), i.e. it comprises:

The channel code rate: for example ¼, ⅓, ½ etc;
the order of the modulation chosen: for example BPSK (Binary Phase Shift Keying), QPSK (Quadrature PSK), 16 QAM (16-Quadrature Amplitude Modulation) etc.

In particular, the technique referenced SIC-PARC (Successive Interference Cancellation—PARC) enables the transmission of independent data streams which may have different rates on each of the transmit antennas of a multi-antenna system. In this technique, the power given at transmission may be uniformly distributed among all the transmit antennas.

At reception, the Signal-to-Interference-plus-Noise Ratio (SINR) associated with each of the transmit antennas is determined from an estimation of the transmission channel.

Thus, a receiver knowing a family of modulation and encoding schemes available at transmission can determine the modulation and encoding techniques to be used in transmission to minimize the difference with the theoretical performances and forward these elements to the transmitter by means of a piece of information coming from the receiver, also called "instantaneous partial feedback" carried for example by a CQI (Channel Quality Indicator) message.

More specifically again, the transmission standard considered is used to define a family of modulation and encoding schemes and therefore discrete rates enabling a receiver to determine the MCS and hence the discrete per antenna rates to be used.

An improvement in this prior-art technique, known as S-PARC, is described especially in Ericsson, "Selective Per Antenna Rate Control", 3GPP TSG RAN WG1, February 2004, illustrated with reference to FIG. 6. This technique has the advantage of enabling the selection of a set of active transmit antennas from among the available transmit antennas. Thus, two sub-sets of transmit antennas are distinguished: active antennas and non-active antennas.

Thus, rather than all the streams associated with each transmit antenna independently, only the streams associated with an active transmit antenna are considered. Thus, the number of independent streams transmitted, equal to the number of active antennas, is smaller than or equal to the total number of transmit antennas.

The transmit antennas can be selected as a function of the quality of the transmission channel and/or the correlation of the transmit antennas, so as to maximize especially the sum of the rates on all the streams and hence the total capacity of the system.

In other words, the allocation of discrete rates to each transmit antenna is based on the reception of one CQI per antenna, indicating the discrete per antenna rate (MCS) to be used.

Thus, as illustrated in FIG. 6, a receiver starts by estimating the transmission channel during a first step 61. In a following step 62, the receiver determines the SINR ratio associated with each of the transmit antennas and sends this information back to the transmitter (as feedback). The associated transmitter can then select (63) the active transmit antennas and deduce therefrom the theoretical rate to be used per antenna and the modulation and coding scheme MCS to be used (64) to minimize the difference with the theoretical rate. Finally, the transmitter transmits data packets on the basis of the active transmit antennas during a step 65.

However, one drawback of this technique is that it does not take account of the set of discrete rates available at transmission during the selection of the active antennas. In practice, this technique therefore suffers from a quantification noise due to the family of discrete rates available. Consequently, the discretization of the theoretical rates applied subsequently (i.e. the choice of modulation and coding scheme MCS to be used to minimize the difference with the theoretical rate, among the available MCS values) prompts a loss of spectral efficiency.

Another technique seeks to optimize the power values and the rates allocated. For example, S. T. Chung et al in "Approaching the MIMO Capacity with low-rate feed-back channel in V-BLAST" (*Eurasip Journal on applied signal processing*, pages 762-771, 2004), propose a technique for the joint optimizing of the decoding order and the power values allocated to each of the transmit antennas so as to comply with the transmission constraints, especially the constraints related to discrete rates (MCS). This technique is known as the "SRPQ2: efficient decoding order" (SRPQ2=successive rate and power quantization).

This technique also uses a scalar type encoding which is independent for each antenna, chosen so as to approximate a maximum capacity defined by Shannon's limit, especially in order to obtain a low binary error rate and thus maximize the total capacity of the system.

However, one drawback of this technique of joint optimization of rates and power values associated with the search for optimum decoding order to match the discrete distribution of rates available is that it works only in the context of scalar encoding.

It is observed indeed that the prior-art techniques continue to process each transmit antenna separately (scalar encoding) or else all the transmit antennas simultaneously (multidimensional encoding).

SUMMARY

An aspect of the disclosure relates to a method for receiving a received signal, corresponding to a data signal sent out by a transmitter to a receiver through a transmission channel, said transmitter comprising $N_T$ transmit antennas and said receiver comprising $N_R$ receive antennas, with $N_T$ and $N_R$ being greater than or equal to 2.

According to an embodiment of the invention, a reception method of this kind comprises the following steps:
  analyzing said received signal, delivering a piece of information representing said transmission channel;
  determining periodically and/or as a function of a variation of said transmission channel:
    at least one distribution of said transmit antennas into at least one group of at least one antenna as a function of said piece of information representing the transmission channel, at least one group comprising at least two transmit antennas for at least one of said determining steps;
    specific rates allocated respectively to each of said groups of antennas for each distribution as a function of said piece of information representing the transmission channel;
  transmitting to said transmitter a parameterizing signal defining said distribution or distributions and said specific rates.

Thus, an embodiment of the invention proposes a technique to adapt a distribution by group of transmit antennas as a function of a piece of information representing the transmission channel so as to optimize the transmission performance as a function especially of the rates of codes available at transmission. We thus consider a partitioning of the transmit antennas, i.e. disjoint groups of transmit antennas, a group comprising at least one transmit antenna.

The method of an embodiment of the invention enables therefore the transmission to the transmitter of a parameterization signal defining information on adaptation comprising at least one distribution into groups and the rates allocated to each group according to the different distributions, to choose the appropriate values of these parameters so as to optimize the bit rate (the capacity) and/or the robustness, etc of the multi-antenna system. This parameterization signal is for example transmitted from the receiver to the transmitter (it is feedback from the receiver) by means of a CQI message.

For example if several distributions that can be envisaged are defined in the parameterization signal, it is the transmitter that selects the most suitable distribution, at reception of this parameterization signal.

By contrast, if a unique distribution is defined in the parameterization signal, this distribution of the transmit antennas will be imposed on the transmitter.

It will be noted that a change in the distribution of the transmit antennas can modify the values of capacity of the transmission channel obtained for each group and thus make it necessary to modify certain rates assigned in transmission so as to optimize transmission performance, while at the same time complying with the discrete rates available at transmission.

Naturally, the groups of antennas are considered to be capable of having distinct cardinality, i.e. the different groups of antennas do not necessarily have the same number of transmit antennas.

It is also considered to be the case that the maximum number of transmit antennas in a group should not exceed the number of receive antennas. Thus, the number of transmit antennas in a group ranges from 1 to $N_R$.

Thus, an embodiment of the invention proposes a system taking account of the existence of a limitation of the number of code rates available to the transmitter (fixed by the transmission standard considered) which is aimed at reducing the quantization noise.

In particular, the steps of analysis and transmission are also implemented periodically and/or as a function of a significant variation of said transmission channel, i.e. a variation above a pre-determined threshold.

These steps of analysis and transmission can also be implemented as a function of a request from a user or again a request from the sender (transmitter).

Thus, the groupwise distribution of the transmit antennas and the rates assigned to each group of antennas are adapted so as to make optimum use of the multi-antenna system.

According to a particular characteristic of an embodiment of the invention, said determining step determines specific power values respectively allocated to each of said transmit antennas, and said parameterization signal also defines these power values.

Thus, different pieces of information on adaptation, also called parameters, are adapted as a function of piece of information representing the transmission channel and especially the quality of this channel so as to optimize the performance of the multi-antenna system.

According to one particular embodiment, the reception method comprises a step of selecting transmit antennas from among said $N_T$ transmit antennas called active antennas at least as a function of said piece of information representing the transmission channel. Said parameterization signal then also defines the active antennas, i.e. it includes a piece of information enabling the selected antennas to be identified.

More specifically, this step for the selection of antennas may lead to the deactivation of the non-selected transmit antennas. Thus, according to this embodiment, each transmit antenna of the multi-antenna system is scanned and the antennas showing for example an excessively great correlation or that are associated with a highly noisy transmission channel, etc, are deactivated. This activation/deactivation of the transmit antennas is especially implemented so as to optimize the capacity of the multi-antenna system.

For example, the parameterization signal may define a group comprising the set of deactivated transmit antennas and define a zero rate allocated to this group of transmit antennas.

In particular, according to a particular choice of channel, the antenna selection algorithm can suggest the use of all the transmit antennas available, i.e. the $N_T$ transmit antennas.

According to one particular aspect of an embodiment of the invention, the selection step is implemented jointly with said determining step.

In other words, the step of selection of the active transmit antennas takes account of at least certain pieces of matching information and vice versa.

Indeed, the joint optimization of the selection of antennas and of the adaptation of rates makes it possible especially to prevent major deterioration of the overall capacity of the multi-antenna system caused by the discretization of the rates at transmission.

For example, an optimized ordered distribution $\Gamma^*$, the specific rates per group $R^*$ for this distribution, and an optimized set $S^*$ of the active antennas may be determined from the following equations:

$$(S^*, \Gamma^*) = \arg\max_{S, \Gamma} T_{S, \Gamma}$$

$$R^* = \bigcup_{i=1}^{K} \{r^*_{\Delta_i}(S^*, \Gamma^*)\}$$

with:

$$T_{S,\Gamma} = \sum_{i=1}^{K} r^*_{\Delta_i}(S, \Gamma);$$

$$r^*_{\Delta_i}(S, \Gamma) = \arg\min_{r_{\Delta_i} \in J_{|\Delta_i|}} (c_{\Delta_i} - r_{\Delta_i})$$

such that $r^*_{\Delta_i}(S, \Gamma) \leq c_{\Delta_i}$;

$$c_{\Delta_i} = \log_2 \det(I_{|\Delta_i|} + A_{\Delta_i}(P_1, \ldots, P_{N_T}, H, \rho));$$

where:
H represents said transmission channel;
$\rho$ corresponds to the signal-to-noise-ratio;
$\{P_1, \ldots, P_{N_T}\}$ corresponds to a set of transmission power values assigned to each transmit antenna;
$J_{|\Delta|}$ corresponds to a set of discrete rates available at transmission;
$\Delta$ corresponds to a group included in the distribution $\Gamma$;
$A_\Delta$ is a matrix representing said receiver.

According to a particular aspect of the invention, said distribution is determined in taking account of at least one of the elements belonging to the group comprising:
discrete rates available at transmission;
power values associated with each distribution into groups of said transmit antennas;
a decoding order implemented at the receiver side;
the number $N_R$ of receive antennas;
a number of active transmit antennas.

Thus, the groupwise distribution of the transmit antenna is adapted during transmission, for example for the more efficient tracking of the variations of the transmission channel.

In particular, during the choice of the partitioning of the antennas in transmission mode, it is possible that several partitions may attain the maximum capacity of the system. The optimum partition is then chosen so as to comply with the vital hardware constraints, such as low decoding complexity, minimum "feedback" between the receiver and the transmitter, etc.

In particular, the reception method according to one of the embodiments of the invention implements a step for determining an ordering of said groups and a decoding step implemented successively for each group following said ordering.

Thus, an embodiment of the invention plays on the available degrees of freedom, for example the decoding order of the different groups, the way to partition the transmit antennas by groups and the distribution of the rates in transmission, in taking account of the schemes of modulation and coding available at transmission defined by the standard considered, so as to reduce the gap between the theoretical rates and the available rates.

In particular, a change in the distribution into groups of the transmit antennas requires a modification of the ordering scheme.

In particular, said ordering scheme minimizes a metric taking account of the distributions into groups of said transmit antennas and/or power values given by said transmit antennas and/or specific rates and/or a decoding order.

Another aspect of the invention concerns a method of sending or transmitting a data signal from a transmitter to a receiver through a transmission channel, said transmitter comprising $N_T$ transmit antennas and said receiver comprising $N_R$ receive antennas, with $N_T$ and $N_R$ being greater than or equal to 2.

According to an aspect of the invention, a transmission method of this kind comprises the following steps:
receiving a parameterization signal transmitted by said receiver defining:
at least one distribution of said transmit antennas into at least one group of at least one antenna;
specific rates allocated respectively to each of said groups of antennas, for each distribution;
obtained, as a function of a piece of information representing the transmission channel, by a periodic determination and/or a determination as a function of a variation of the transmission channel, at least one group comprising at least two transmit antennas for at least one determination operation;
selecting one of said distributions among said distribution or distributions defined in said parameterization signal;
distributing said transmit antennas according to the groups of said selected distribution;
assigning the corresponding specific rate defined in said parameterization signal to each of said groups.

Such a transmission method is adapted especially to receiving a parameterization signal sent for example according the reception method described here above.

Thus, this transmission method is adaptive and controlled by a feedback from the receiver, for example during the updating of the parameters defined in the parameterizing signal.

In another embodiment, the invention concerns a device for receiving a received signal, corresponding to a data signal sent out by a transmitter to a receiver through a transmission channel, said transmitter comprising $N_T$ transmit antennas and said receiver comprising $N_R$ receive antennas, with $N_T$ and $N_R$ being greater than or equal to 2.

According to an embodiment of the invention, such a reception device comprises:

means of analyzing said received signal, delivering a piece of information representing said transmission channel;

means of determining periodically and/or as a function of a variation of said transmission channel:

at least one distribution of said transmit antennas into at least one group of at least one antenna as a function of said piece of information representing the transmission channel, at least one group comprising at least two transmit antennas for at least one of said determining operations;

specific rates allocated respectively to each of said groups of antennas for each distribution as a function of said piece of information representing the transmission channel;

means of transmitting to said transmitter a parameterizing signal defining said distribution or distributions and said specific rates.

Such a reception device is especially adapted to implementing the reception method described here above. It is, for example, a base station or a radio telephone type terminal, laptop, PDA or personal digital assistant, depending on whether it is in a downlink or an uplink.

Another aspect of the invention concerns a transmitter device for sending a data signal to a receiver through a transmission channel, said transmitter device comprising $N_T$ transmit antennas and said receiver comprising $N_R$ receive antennas, with $N_T$ and $N_R$ being greater than or equal to 2.

According to an embodiment of the invention, a transmitter device of this kind comprises:

means for receiving a parameterization signal (15) transmitted by said receiver defining:

at least one distribution of said transmit antennas into at least one group of at least one antenna;

specific rates allocated respectively to each of said groups of antennas, for each distribution;

obtained, as a function of a piece of information representing the transmission channel, by a periodic determination and/or a determination as a function of a variation of the transmission channel, at least one group comprising at least two transmit antennas for at least one determination operation;

means of selecting one of said distributions among said distribution or distributions defined in said parameterization signal;

means of distributing said transmit antennas according to the groups of said selected distribution;

means of assigning the corresponding specific rate defined in said parameterization signal to each of said groups.

Such a transmitter device is especially adapted to implementing the sending method described here above. It is, for example, a base station or a radio telephone type terminal, laptop, PDA or personal digital assistant, depending on whether it is in a downlink or an uplink.

Yet another embodiment of the invention concerns a computer program product downloadable from a communications network and/or stored on a computer-readable medium and/or executable by a processor comprising program code instructions for the implementation of the reception method described here above and/or a computer program product downloadable from a communications network and/or stored on a computer-readable medium and/or executable by a processor comprising program code instructions for the implementation of the sending method described here above.

Finally, another aspect of the invention concerns a signal for parameterizing a transmitter, transmitted from a receiver to said transmitter through a transmission channel, said transmitter comprising $N_T$ transmit antennas and said receiver comprising $N_R$ receive antennas, with $N_T$ and $N_R$ being greater than or equal to 2.

According to an embodiment of the invention, such a parameterizing signal comprises at least one parameterizing field comprising:

a piece of information relating to at least one distribution of said transmit antennas into at least one group of at least one antenna; and a piece of information relating to specific rates allocated respectively to each of said groups of antennas, for each distribution;

obtained, as a function of a piece of information representing the transmission channel, by a periodic determination and/or a determination as a function of a variation of the transmission channel, at least one group comprising at least two transmit antennas for at least one determination operation.

Such a parameterizing signal may especially, according to the reception method described here above, define different parameters or pieces of adaptation information implemented in transmission, such as the distribution of the transmit antennas into groups, the rates assigned to each group, the selected antennas (active antennas), the power values assigned to each transmit antenna etc.

This parameterizing signal could of course comprise the different characteristics relating to the reception method according to an embodiment of the invention.

BRIEF DESCRIPTION OF THE DRAWINGS

Other features and advantages shall appear more clearly from the following description of a preferred embodiment, given by way of a simple non-exhaustive and illustrative example, and from the appended drawings, of which.

DETAILED DESCRIPTION OF ILLUSTRATIVE EMBODIMENTS

Figure 1:
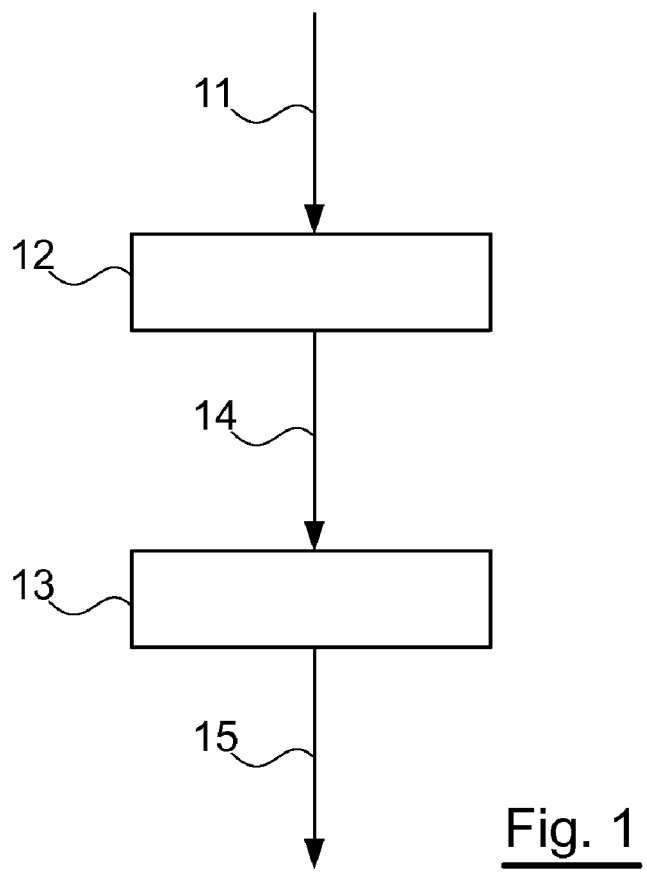
FIG. 1 illustrates the main steps of the method of reception according to an embodiment of the invention.

1. Description of an Embodiment of the Invention 1.1 General Principal

The general principal of an embodiment of the invention relies on the transmission of a parameterizing signal from a receiver to a sender in a MIMO system comprising at least two transmit antennas and at least two receive antennas, this parameterizing signal being used to define information of adaptation, on the transmission side, comprising at least:

one distribution into one or more groups of transmit antennas, and specific rates assigned to each of the groups of transmit antennas for each distribution.

The description here thus considers an adaptive distribution of the transmit antennas, i.e. from one feedback information from the receiver to the transmitter to another, the choice of the partition may differ, thus enabling adaptation to variations in the transmission channel.

In particular, the feedback from the receiver may either include a unique distribution into groups and thus impose its choice on the sender or include several conceivable modes of distribution and then allow the transmitter the choice of the optimized distribution among these conceivable modes of distribution.

Thus, the utility of grouping together the transmit antennas in this particular embodiment of the invention lies in a better adaptation of the available rates given an optimized distribution choice.

Furthermore, according to one alternative embodiment described here below, the parameterizing signal may also define the power values allocated per antenna, thus enabling a better adaptation to the available rates.

The modification of the transmission power values will subsequently imply the obtaining of new values of capacities for each group of antennas, which may necessitate a modification of the scheduling (also called decoding order) chosen so as to preserve an optimized multi-antenna system.

In principal, it is necessary to ensure that the distribution of power per transmit antenna does not excessively lower the capacity of the multi-antenna system. It is therefore desirable to define a maximum range of variations around a mean power value associated with each transmit antenna and a quantification step.

According to another variant, the parameterizing signal may also define the active antennas and the non-active antennas.

According to yet another variant, an embodiment of the invention is situated in a reduced feedback context, where the adaptation of the transmission power values is not considered. Thus, a power value predetermined and equidistributed among the different transmit antennas (active) is considered in the absence of knowledge of the channel in transmission.

Here below, we shall focus on a more precise description of a particular embodiment of the invention in which a data signal is transmitted from a transmitter comprising $N_T$ transmit antennas to a receiver comprising $N_R$ receive antennas through a transmission channel where $N_T$ is greater than or equal to 2 and $N_R$ is greater than or equal to 2.

More specifically, in this particular embodiment, the receiver determines a unique distribution by groups of the transmit antennas, and specific rates allocated to each group, as a function of a piece of information representing the transmit channel (for example an estimation of the propagation channel or of the SNR (signal-to-noise) ratios), and transmits this information on adaptation to the transmitter by means of a parameterizing signal.

It is deemed to be the case especially that in this embodiment of the invention, the maximum number of transmit antennas in a group should not exceed the number of active antennas in reception. This constraint arises especially out of spatial whitening of the output of the MMSE vector detector.

More specifically, we consider a "rate" corresponding to a choice of space-time modulation and coding scheme (ST-MCS), i.e. it defines the overall rate of the space-time code. In other words, the rate of the space-time code comprises the rate of the channel code and the order of the modulation chosen (for example, an ST-BICM using four transmit antennas and a rate 1/3 convolutive code with QPSK modulation has an overall rate of $$4 \times \frac{1}{3} \times 2).$$

It may be recalled that it is desirable to choose space-time codes capable of approaching the Shannon capacity.

Thus, this embodiment proposes a detection (space-time detection) of the streams associated with each group of transmit antennas based on a successive cancellation of interference.

More specifically, it may be recalled that an embodiment of the invention is not limited to an MMSE type detection by group of antennas using a successive cancellation of interferences but assumes that the computed capacities per group come from an unspecified detector per group, based on a successive cancellation of interference, for which a formula of capacity for each group may be obtained as a function of the channel estimation.

Thus, an embodiment of the invention can be applied in systems having frequency-selective transmission channels (monocarrier type systems) as well as in systems having frequency non-selective channels (multicarrier type systems).

1.2 Reception Side

Thus, referring to FIG. 1, we present the general principle of the reception method according to a particular embodiment of the invention.

In the example, we consider a received signal 11 corresponding to the data signal sent after passage into the transmission channel.

More specifically, during a first step 12, the received signal 11 is analyzed so as to obtain at least one piece of information 14 representing the transmission channel. This piece of information 14 corresponds for example to an estimation of the transmission channel between the transmitter and the receiver.

This piece of information 14 is used especially during a second step 13 to build a parameterization signal 15 by which it is possible to define a distribution of the $N_T$ transmit antennas into groups of antennas and specific rates respectively assigned to each of the groups of antennas.

The parameterization signal 15 is then transmitted to the transmitter of the MIMO system, for example in the form of a CQI message.

Figure 7:
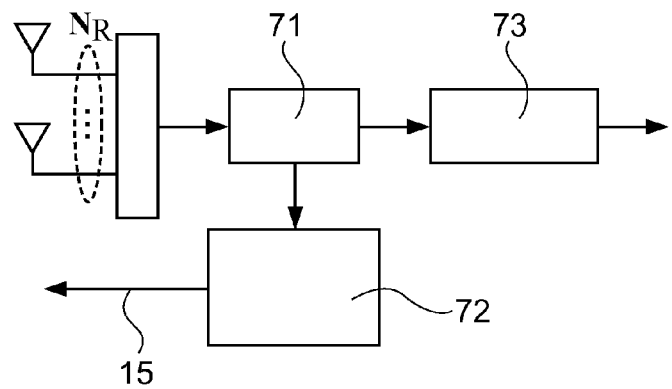
FIG. 7 proposes an example of a reception device in a multi-antenna transmission system according to an embodiment of the invention.

More specifically, FIG. 7 provides an illustration in simplified form of a reception device comprising $N_R$ receive antennas according to this example of an embodiment.

This reception device comprises means (71) for the analysis of the received signal from an estimation of the transmission channel for example, determining means (72) for determining a distribution of the transmit antennas and of the specific rates assigned to each group and means (73) for decoding the transmitted packet.

In particular, according to one variant of an embodiment of the invention, these determining means (72) jointly perform a selection of the transmit antennas and/or receive antennas enabling the deactivation of certain transmit and/or receive antennas. More specifically, the sub-set of active antennas in transmission and/or in reception is chosen from among all the possible combinations so as to maximize for example the discrete sum capacity of the transmission system or the overall capacity (i.e. without taking account of the quantization of the rates) of the system. The optimization is also done on all the radio links.

The use of an algorithm for selecting transmit antennas makes it possible especially to offer better performance to the transmission system since the power is not wasted when sending on highly disturbed links, for example weak radio links.

Furthermore, the use of such an algorithm is advantageous for correlated fading MIMO channels or non-correlated fading MIMO channels having more antennas in transmission than in reception ($N_T > N_R$).

It may also be recalled that the selection in reception makes it possible essentially to diminish the complexity of a processing by the receiver.

Thus the information on adaptation (such as the partitioning of the transmit antennas, the allocated power values, the rates used in practice (smaller than or equal to those computed) as well as the decoding order) are defined either jointly with the number of active antennas of the MIMO channel or once the number of active antennas have been determined. The correlated processing of these different pieces of information makes it possible especially to diminish the quantization noise and hence enables an increase in performance in terms of spectral efficiency.

The sending power can especially be pre-determined and equidistributed between the different active transmit antennas.

This variant of an embodiment in which the selection of transmit antennas, the determining of the distribution, the determining of the rates assigned to each of the groups of antennas and possibly the optimizing of the decoding order are determined in a correlated way (i.e. in taking account of all this information jointly) is described in greater detail here below.

At least some of this adaptation information is then sent back to the transmitter in the form of a parameterization signal (CQI message). The transmitter is then capable of adapting to the optimum partition chosen as well as to the rates to be used for the transmission of a data packet.

On the receiver side, the decoding of the transmitted packet is implemented according to the decoding order chosen after channel estimation and before the transmission of the packet.

Figure 2:
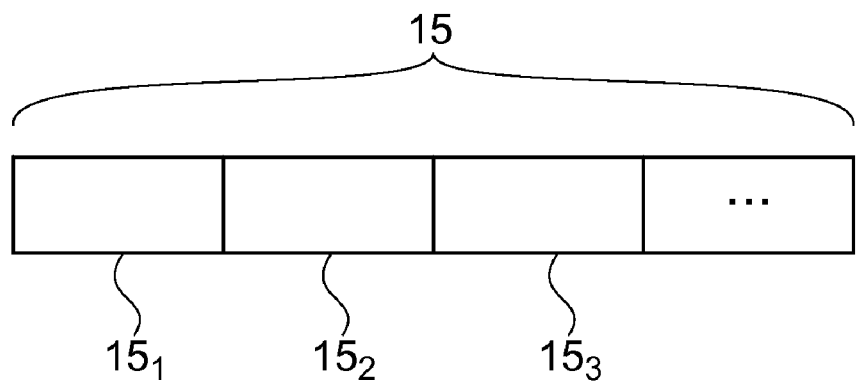
FIG. 2 shows an example of a structure of a parameterizing signal.

More specifically, FIG. 2 illustrates an example of a structure of the parameterization signal 15.

This signal comprises at least one first parameterization field $15_1$, comprising a piece of information on a groupwise distribution of the transmit antennas and a second parameterization field $15_2$ comprising a piece of information on specific rates respectively allocated to each of the groups of transmit antennas.

Furthermore, this parameterization signal 15 may also include a field $15_3$ carrying a piece of information on specific power values respectively allocated to each of the transmit antennas or again a field (not shown) bearing a piece of information on active transmit antennas.

1.3 Transmission Side

Figure 3:
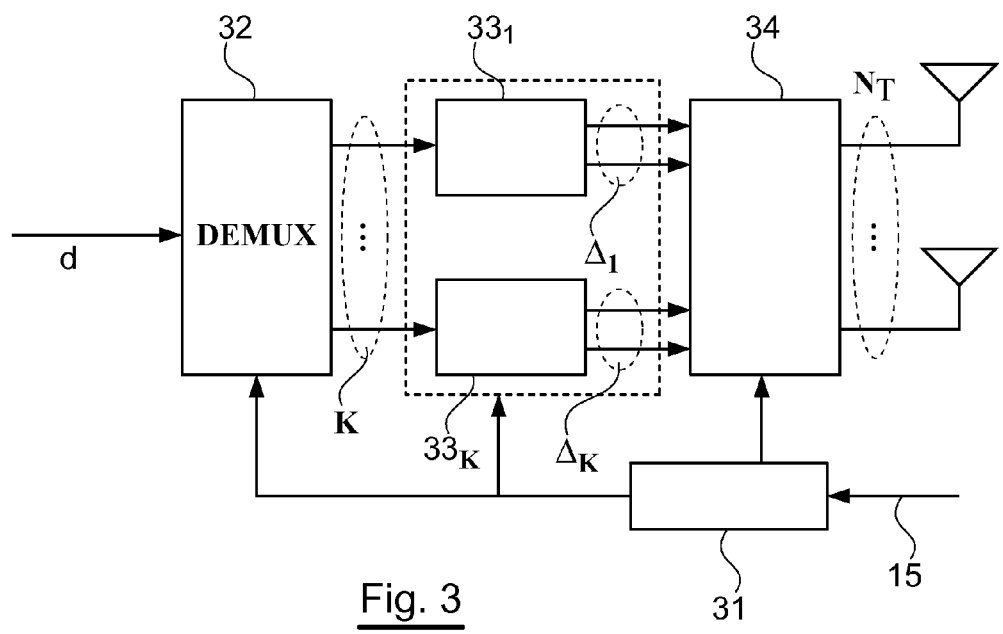
FIG. 3 illustrates an example of a transmit or sending device in a multi-antenna transmission system according to FIG. 2 shows an example of a structure of a parameterizing signal.

FIG. 3 provides a more precise illustration of the working on the transmission side.

As illustrated in FIG. 3, the parameterization signal 15 transmitted by the receiver, is received by the transmitter of the multi-antenna system.

During a control step 31, the different fields of the parameterization signal 15 are analyzed so as to adapt the transmitter, in defining at least the distribution of the transmit antennas by group and the rates associated with each group.

Thus, after reception of the adaptation information coming from the receiver, the transmitter is especially capable of adapting to the partition for the instant of transmission t, as well as to the rates per group. Once the choice of the partition has been done, the control module 31 is used to reconfigure a demultiplexer 32 in K outputs and then apply a space-time code module to each of its outputs. In particular, once the partition is chosen the control module 31 determines the transmit antennas applied to each group. For instance, in considering a multi-antenna system comprising $N_T = 6$ transmit antennas referenced $N_{T_1}, N_{T_2}, \ldots, N_{T_6}$, and taking a partition numbered $\chi$ comprising three groups (K=3), namely a first group $\Delta_1$, comprising three transmit antennas, a second group $\Delta_2$ comprising one transmit antenna and a third group $\Delta_3$ comprising two transmit antennas, then the control module chooses for example $(N_{T_3}, N_{T_4}, N_{T_6}) \in \Delta_1$, $(N_{T_1}, N_{T_2}) \in \Delta_2$ and $(N_{T_5}) \in \Delta_3$, this distribution enabling an optimization of the performance of the multi-antenna system.

More specifically, the binary data stream d input of the transmitter is first of all de-multiplexed during a step DEMUX 32 and converted into a number of independent streams K corresponding to the number of transmit antenna groups defined in the parameterizing signal 15 and extracted during the control step 31.

According to this example, the K streams are each encoded separately and mapped in an MCS modulation and coding block $33_1, \ldots, 33_K$. More specifically, the MCS blocks may be of a space-time modulation and coding scheme (ST-MCS) type such as for example the space-time encoding using an ST-BICM (Space-Time Bit Interleaved Coded Modulation).

In particular, this modulation and coding scheme relies on a scalar code and can be sub-divided into three successive modules comprising:
- an encoder (implementing for example an LDPC code);
- a binary interleaver; and
- a modulator (implementing for example a quadrature amplitude modulation or QAM16).

The modulation and encoding scheme $33_1, \ldots, 33_K$, controlled by the controller 31 taking account of the parameterization signal 15 thus enables a definition of the specific rates respectively allocated to each of the transmit antenna groups $\Delta_1, \ldots, \Delta_K$. According to one alternative embodiment, these schemes are also used to define specific power values respectively allocated to each of the transmit antennas.

Finally, the encoding and modulation blocks $33_1, \ldots, 33_K$ are followed by a switch 34 (also called a demultiplexer) performing a bijection of the set of data streams on all the active antennas.

In particular, the use of a scheme of this kind for the space-time codes makes it possible to easily obtain families of codes whose cardinality is strictly greater than 1. Indeed, it is enough to multiply the desired cardinality by the scalar rates to obtain these families of space-time codes.

On the receiver side, the decoding of the data is done by layer for each group $\Delta_1, \ldots, \Delta_K$ of antennas.

More specifically, from the samples received, the first layer is detected vectorially (vector detector base for example on an MMSE criterion) and then decoded. Thus, the decoding order j can provide for decoding the group $\Delta_1$ at a first layer and then decoding the group $\Delta_K$ at a following layer.

After a layer has been decoded, the signal is re-encoded and then the interference values are regenerated and then subtracted from the received multiplexed signal. A successive vector interference elimination is then performed.

It may be recalled that in this embodiment the maximum number of transmit antennas in a group should not exceed the number of active receive antennas. This constraint arises especially from the spatial whitening of the output of the MMSE vector detector.

1.4 Determining Adaptation Information

We consider here below a first embodiment in which the adaptation information is determined after the selection of the active transmit antennas.

More specifically, the determining of an optimum decoding order relies on a minimizing of a metric $M_{j,\chi}$ associated with the partitions chosen $\{X_1, \ldots, X_M\}$, at the power values given by the antenna $\{P_1, \ldots, P_{N_T}\}$, and a decoding order j, denoted $M_{j^*,\chi^*}$, given families of codes available at transmission:

$$M_{j^*,\chi^*} = \min_{j,\chi} M_{j,\chi}\left(P_1^*, \ldots, P_{N_T}^*, R_{k_{1,j}^*}^{|\Delta_1|}, \ldots, R_{k_{K,j}^*}^{|\Delta_K|}\right) \quad (1)$$

It may be recalled that the families of space-time codes (STC) available at transmission impose potential cardinalities of the transmit antenna groups and that no group can have more transmit antennas than active antennas at reception.

The information to be transmitted to the transmitter can then be expressed in the form:

$$\{k_{1,j^*}^{\chi^*}, \ldots, k_{K,j^*}^{\chi^*}, \chi^*\} = \{CQI_1, \ldots, CQI_K, CQI_{K+1}\}$$

and the set of power values $\{P_1^*, \ldots, P_{N_T}^*\}_{j^*,\chi^*}$, where:

$$\begin{cases} M_{j,\chi}\left(P_1^*, \ldots, P_{N_T}^*, R_{k_{1,j}^*}^{|\Delta_1|}, \ldots, R_{k_{K,j}^*}^{|\Delta_K|}\right) = F\left(c_{\Delta_1,j}(P_1^*, \ldots, P_{N_T}^*), \ldots, c_{\Delta_K,j}(P_1^*, \ldots, P_{N_T}^*), R_{k_{1,j}^*}^{|\Delta_1|}, \ldots, R_{k_{K,j}^*}^{|\Delta_K|}\right) & (2) \\ \{\{P_1^*, \ldots, P_{N_T}^*\}, k_{1,j}^*, \ldots, k_{K,j}^*\} = \arg\min_{k_1, \ldots, k_K, P_1, \ldots, P_{N_T}} F\left(c_{\Delta_1,j}(P_1, \ldots, P_{N_T}), \ldots, c_{\Delta_K,j}(P_1, \ldots, P_{N_T}), R_{k_1}^{|\Delta_1|}, \ldots, R_{k_K}^{|\Delta_K|}\right) & (3) \\ \sum_{t=1}^{N_T} P_t = P \text{ et } \sum_{t=1}^{N_T} |P_t - P_t^0|^2 \leq \varepsilon & (4) \end{cases}$$

with $$c_{\Delta_i,j}(P_1, \ldots, P_{N_T}) \geq R_{k_i}^{|\Delta_i|}, \quad \forall i \in [1, K]$$

with the following notations:
 $N_T$ the number of transmit antennas;
 $n_T$ the number of active transmit antennas, $n_T \leq N_T$;
 $N_R$ the number of active reception antennas;
 $\chi$ the number of the partition $X = \{\Delta_1, \ldots, \Delta_K\}$ of the active transmit antennas;
 $|\Delta_i|$ the cardinality of the group of antennas $\Delta_i$;
 K the number of transmit antenna groups associated with the partition numbered $\chi$.

The relationships according to (4) can be used especially to comply with certain practical constraints. Indeed, the first $$\sum_{t=1}^{N_T} P_t = P$$

implies compliance with the power available at the transmitter. Bringing about a variation in one of the values of a set of power values therefore leads to modifying at least one other value of this same set of values. As for the second constraint $$\sum_{t=1}^{N_T} |P_t - P_t^0|^2 \leq \varepsilon,$$

its aim is to limit the variations in power in order to protect the capacity from excessive deterioration.

Let $\{X_1, \ldots, X_M\}$ denote the set of partitions considered verifying the following condition:

$$\forall X, \forall \Delta_i \in X \text{ where } i \in [1,K] \text{ we have } |\Delta_i| \leq N_R.$$

Furthermore, let $J_l = \{R_1^l, \ldots, R_{N_l}^l\}$ be the family of $N_l$ discrete rates available for the groups $|\Delta_i| = l$, $l \geq 2$ corresponding to a space-time code comprising l transmit antennas. It must be noted that the family where l=1 corresponds to a classic scalar encoding.

$C_{\Delta_i,j}$ thus corresponds to the "continuous" rate obtained for the group of antennas $\Delta_i$ relative to the decoding order j.

$$R_{k_{i,j}^*}^{|\Delta_i|}$$

is the rate value chosen from among the rates of cardinality $|\Delta_i|$ available for the group i and for the given partition numbered $\chi$.

Thus, at each ordered partition $\Gamma$ (i.e. at a given value of $\chi$ and j), the metric $M_{j,\chi}$ is computed from a metric F. This metric F is a function of the theoretical rates (which may take any value) conditioned by their capacity which is itself a function of the set of power values $\{P_1, \ldots, P_{N_T}\}$ allocated to each transmit antenna and rates selected from among those available.

The choice of the rates is done by minimizing both the transmit power values and the indices k used to choose the discrete rate closest to the theoretical one.

Finally, once all the values $M_{j,\chi}$ have been computed, the minimal value $M_{j^*,\chi^*}$ is retained and with it the ordering j* and the associated partition numbered $\chi^*$.

The search for the minimum metric is therefore done according to this embodiment on all the permutations of the successive ordered decoding operations, on all the power values and on all the partitions to be considered.

Finally, the transmitter is informed of the chosen partition and of the choice of the rates to be used for each group of antennas belonging to the chosen partition. By contrast, the order of the decoding does not need to be transmitted to the transmitter since this information is used only at the receiver.

In particular, the problem of identification of the active antennas can be resolved by broadening the partition to include the total number of antennas available at transmission and by choosing a CQI associated with zero rate for the group comprising the inactive antennas.

1.5 Special Cases

Here below, we present several special cases of implementation of the technique according to this first embodiment of the invention.

First of all, in a first aspect, the metric F can take the form of a Euclidian metric with constraint.

Thus, in taking up the above equations again, the right member of the equation (3) can be particularized as follows:

$$F(c_{\Delta_1,j}(P_1,\ldots,P_{N_T}),\ldots,c_{\Delta_K,j}(P_1,\ldots,P_{N_T}),R_{k_1}^{|\Delta_1|},\ldots,R_{k_K}^{|\Delta_K|}) = \quad (5)$$

$$\sum_{i=1}^{K}|c_{\Delta_1,j}(P_1,\ldots,P_{N_T}) - R_{k_i}^{|\Delta_i|}|^2$$

with:

$$c_{\Delta_i,j}(P_1,\ldots,P_{N_T}) \geq R_{k_i}^{|\Delta_i|}$$

According to another aspect, it is sought to reduce the feedback by fixing one or more degrees of freedom of the general system. The fact of fixing certain degrees of freedom means that it is not necessary to send back the corresponding information to the transmitter. Here below, a few examples are given purely by way of an illustration:

1. In a first example, the power values are considered to be uniformly distributed among the different transmit antennas within each group. In this configuration, the set of power values per antenna is reduced to a set of power values per group defined by $\{P_{\Delta_1},\ldots,P_{\Delta_K}\}$. The equations (1), (2) and (3) proposed here above are therefore re-written directly with this restricted set of power values.
2. In a second example, all the power values are a priori fixed at $\{P_1^0,\ldots,P_{N_T}^0\}$. In this configuration, the equation (3) becomes:

$$\{k_{1,j}^*,\ldots,k_{K,j}^*\} = \arg\min_{k_1,\ldots,k_K} F(c_{\Delta_1,j}(P_1^0,\ldots,P_{N_T}^0), \quad (6)$$

$$\ldots,c_{\Delta_K,j}(P_1^0,\ldots,P_{N_T}^0),R_{k_1}^{|\Delta_1|},\ldots,R_{k_K}^{|\Delta_K|})$$

where the set of power values a priori fixed verifies $$\sum_{t=1}^{N_T} P_t^0 = P.$$

It may be recalled that a condition of this kind provides for a high total or overall capacity for the MIMO system on an average (uniform distribution for example). In particular, should the metric considered be Euclidian, the equation (6) here above is simplified, leading to:

$$\begin{cases} M_{j,\mathcal{X}} = \sum_{i=1}^{K} |c_{\Delta_i,j} - R_{k_{i,j}^*}^{|\Delta_i|}|^2 & (7) \\ k_{i,j}^* = \arg\min_{k_i} |c_{\Delta_i,j} - R_{k_i}^{|\Delta_i|}|^2 \forall i = 1,\ldots,K & (8) \\ \text{with } c_{\Delta_i,j} \geq R_{k_i}^{|\Delta_i|}. & (9) \end{cases}$$

The equation (8) can thus be expressed more simply since the minimization is done on each element of the partition with a fixed permutation j whereas in the previous situation (5), the minimization was done jointly on all the elements of the partition.

It is thus noted that the diminishing of quantization noise is all the greater as the number of possible partitions is great.

1.6 Joint Algorithm for the Selection of the Active Antenna

Here below, we consider a second embodiment in which the adaptation information is determined jointly with the selection of the active transmit antennas. In other words, the selection of the active transmit antennas takes account of at least certain pieces of adaptation information and vice versa.

More specifically, a description is provided below of an algorithm for selecting active transmit antennas used to jointly select a sub-set of $n_T$ transmit antennas from among the $N_T$ transmit antennas, a partition of the transmit antennas, an optimum decoding order as well as the optimized discrete rates (MCS) ($n_T \leq N_T$).

Figure 8:
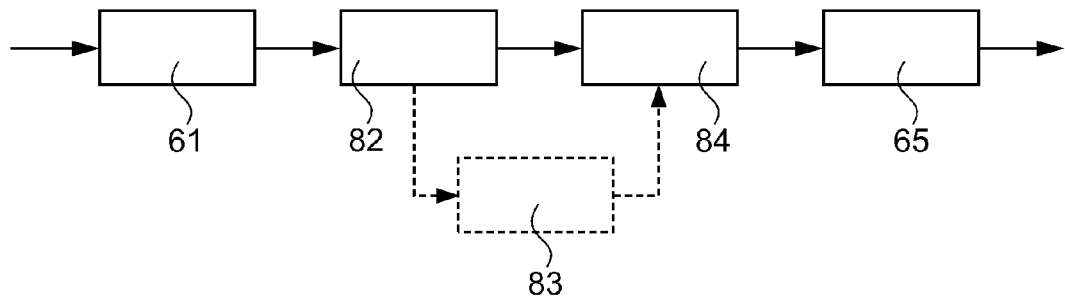
FIG. 8 illustrates the main steps of the selection of active transmit antennas jointly with the determining of adapting information.

As illustrated in FIG. 8, the receiver in this second embodiment and during a step (82) makes a selection of the transmit antennas jointly with the choice of the partition, the decoding order and the modulation and encoding schemes.

In particular, the receiver can know an MCS table to be used (83) which it can use to build the parameterizing signal.

The parameterizing signal is then transmitted to the transmitter (84).

This joint processing can especially be done in reception, in order to limit the number of CQIs sent back to the transmitter and hence to diminish the feedback.

In particular, it must be noted that the selection of transmit antennas does not lead any increase in the quantity of information in the feedback channel of the receiver, especially if the MCS having zero rates is included in the MCS table and if it is assumed that zero rate is assigned to the de-activated antennas.

It is assumed here below that the transmission channel is perfectly estimated.

The antenna selection algorithm relies on the maximizing of the discrete sum capacity based on the knowledge:

of the transmission channel H at reception;

of the signal-to-noise ratio SNR $\rho$;

transmission power values per antenna fixed at $\{P_1,\ldots,P_{N_T}\}$ complying with the constraint of power P available to the transmitter $$\sum_{i=1}^{N_T} P_i = P;$$

and the set of discrete rates available J={{J₁}, {J₂}, ... } where {J₁} is the set of available MCS values {J₂} that of the ST-MCS having cardinality of 2 etc. . . .

The joint selection criterion of the transmit antennas (optimized set of active antennas denoted S*, whose cardinality is smaller than or equal to the number of transmit antennas) with adaptation of the rates per group R* and the optimized ordered partition Γ* can be expressed by:

$$(S^*, \Gamma^*) = \arg \max_{S,\Gamma} T_{S,\Gamma}.$$

We then obtain:

$$R^* = \bigcup_{i=1}^{K} \{r^*_{\Delta_i}(S^*, \Gamma^*)\} \quad (10)$$

with the discrete sum capacity:

$$T_{S,\Gamma} = \sum_{i=1}^{K} r^*_{\Delta_i}(S, \Gamma) \quad (11)$$

which relies on the assignment of discrete rates.

Here below, using the following notations:

$N_T$ number of transmit antennas;
$n_T$ the number of active transmit antennas ($n_T \leq N_T$)
$N_R$ the number of active reception antennas;
S the set of activated transmit antennas such that $S \subset \{1, \ldots, N_T\}$ with d being the cardinality of the set $S : \overline{d} = |S|$;
Γ the ordered partition of the d transmit antennas contained in the set S in K disjoint groups Δ such that ∀i, ∀j≠i, we have $\Delta_i \cap \Delta = \emptyset$, defined by $\Gamma = \{\Delta_1, \ldots, \Delta_K\}$ (the order corresponds to the decoding order);
Δ a group included in the partition Γ of |Δ| as integers $\{\delta_1, \ldots, \delta_{|\Delta|}\}$;
R the ordered set of the discrete rates chosen; and
$T_{S,\Gamma}$ the maximum discrete sum capacity that can be attained for a given embodiment of H, S and Γ, given the family of ST-MCS available at transmission;

we obtain:
∀Γ partition of S, ∀$\Delta_i \in \Gamma$, $$r^*_{\Delta_i}(S, \Gamma) = \arg \min_{r_{\Delta_i} \in J_{|\Delta_i|}} (c_{\Delta_i} - r_{\Delta_i}) \quad (12)$$

such as $r^*_{\Delta_i}(S, \Gamma) \leq c_{\Delta_i}$ with $c_{\Delta_i}$ the theoretical capacity per group of transmit antennas (or layers):

$$c_{\Delta_i} = \log_2 det(I_{|\Delta_i|} + A_{\Delta_i}(P_1, \ldots, P_{N_T}, H, \rho)) \quad (13)$$

From the viewpoint of information theory, the receiver based on a MMSE criterion combined with a subtraction of successive interferences with control of rate per group is optimal assuming independent Gaussian inputs.

The extension of this selection algorithm to another receiver which is not necessarily an optimum receiver can obviously be envisaged.

In particular, it can be noted that the matrices $A_{\Delta_i}$ take a different form depending on the choice made for the receiver. Depending on the type of receiver concerned, these matrices can be computed by knowledge of the transmission channel in reception or else obtained by estimation on the pilot symbols.

Figure 9:
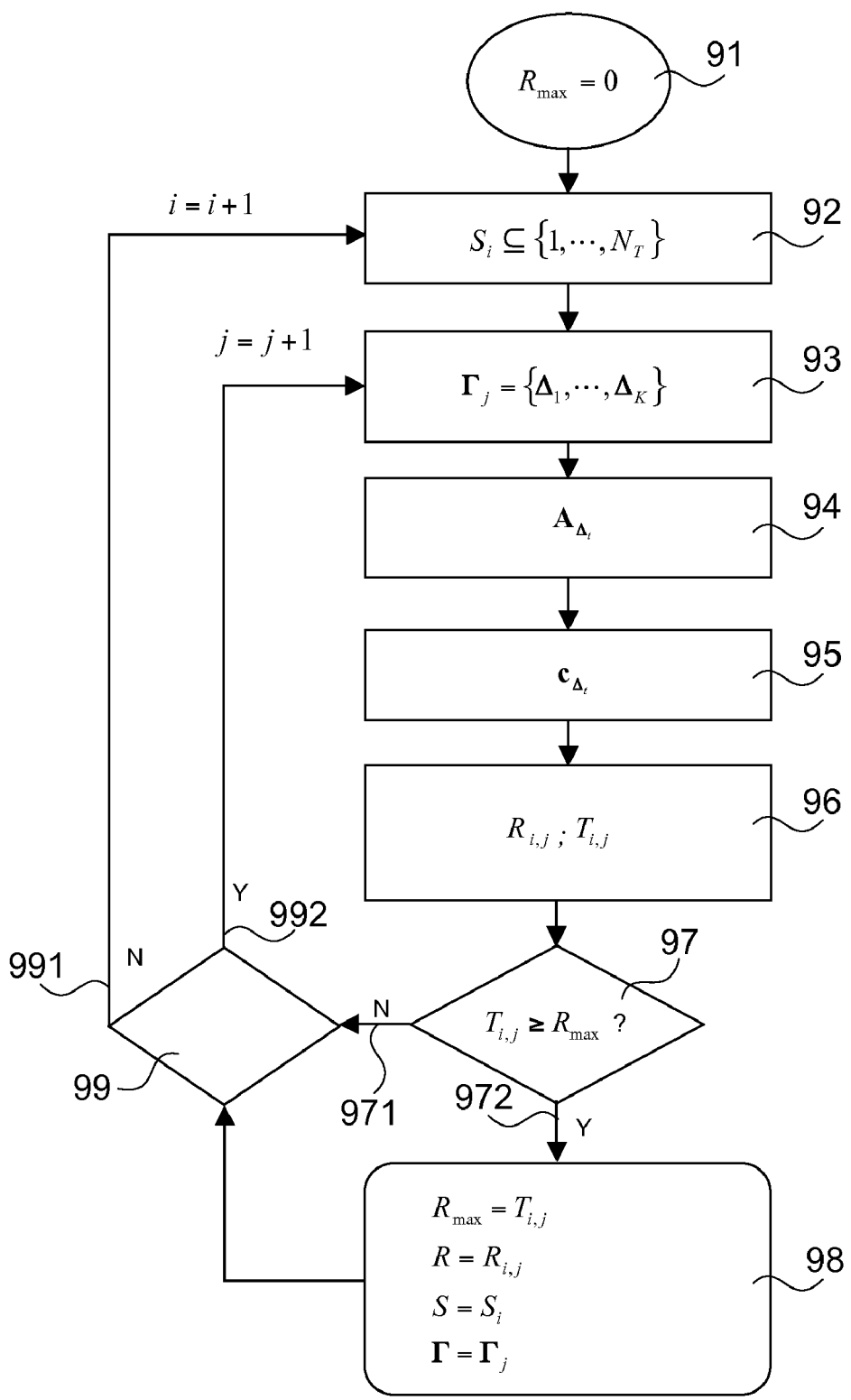
FIG. 9 proposes an algorithm for the selection of the active antenna.

For example, FIG. 9 presents a transmit antenna selection algorithm correlated with the adaptation of the rates.

To this end, it is assumed that the antenna selection algorithm takes account of two inputs: a piece of information on the transmission channel (for example of the type estimation of transmission channel) and a set of discrete rates (table of MCS (possibly ST-MCS) to be considered).

In an initialization step 91, the variable $R_{max}$ is set at zero, this variable corresponding to the maximum rate that can be attained.

Then, for each i (i being an integer) such that the set of transmit antennas is $S_i \subset \{1, \ldots, N_T\}$ (step 92), and for each j (j as an integer) such that the ordered partition $\Gamma_j$ of the set $S_i$ possesses K groups $\Gamma_j = \{\Delta_1, \ldots, \Delta_K\}$ (step 93), in a step 94 we compute the matrices $A_{\Delta_t}$ following the receiver concerned, for each group of antennas $\Delta_t$ for t=1àK.

Then, during a step 95, the corresponding capacities are determined: $c_{\Delta_t} = \log_2 \det (I|_{\Delta_t} + A_{\Delta_t})$.

In a following step 96, the discrete rates $R_{i,j}$ are allocated $$R_{i,j} = \bigcup_{t=1}^{K} \{\lfloor c_{\Delta_t} \rfloor\},$$

and the discrete sum capacity is determined:

$$T_{i,j} = \sum_{t=1}^{K} \lfloor c_{\Delta_t} \rfloor.$$

Finally, the discrete sum capacity $T_{i,j}$ is compared with the maximum rate $R_{max}$ during a test phase 97.

If the condition $T_{i,j} \geq R_{max}$ is verified (972) then we assume $R_{max} = T_{i,j}$ and the selection algorithm stores the following values (98):

S the set of selected transmit antennas such that $S = S_i$;
R the ordered set of corresponding rates such that $R = R_{i,j}$;
Γ the ordered partition such that $\Gamma = \Gamma_j$;
then the operation passes to a step 99 described here below.

If the condition $T_{i,j} \geq R_{max}$ is not verified (971), then the operation passes to the step 99. In this step 99 a check is made to see if another partition is possible. If the answer is yes (992) the variable j is incremented (j=j+1) and the operation returns to the step 93. If not (991), the variable i is incremented (i=i+1) and the operation returns to the step 92.

This algorithm, also called a first algorithm, is reviewed especially in appendix A which is an integral part of the present description.

In particular, it must be noted that the discretization of the capacity per stream (i.e. the capacity for one of the transmit antenna groups considered) on all the available (ST-)MCS is done in the selection algorithm through the operator $\lfloor . \rfloor$ (integer part) enabling a choice of the closest MCS (or ST-MCS) by lower value.

Here below, we present a few examples of particular embodiments of the selection algorithm:

(i) First Example

It is considered to be in the case for example that the receiver is based on an MMSE criterion followed by a succession of interferences. The matrix $A_{\Delta_i}$ can then be written in the following form:

$$A_{\Delta_i} = \rho \Theta_{x_{\Delta_i}} H_{\Delta_i}^\dagger \left( I_{N_R} + \rho \sum_{j>i}^{K} H_{\Delta_j} \Theta_{x_{\Delta_j}} H_{\Delta_j}^\dagger \right)^{-1} H_{\Delta_i} \quad (14)$$

with
$H_\Delta$ the $|\Delta|$ columns of the channel matrix H such that $$H_\Delta = [h_{\delta_1}, \ldots, h_{\delta_{|\Delta|}}];$$

$\Theta_x$ the covariance matrix of the transmit signal x, $\Theta_x = \text{diag}\{P_1, \ldots, P_d\}$;
$\Theta_{x_\Delta}$ the $|\Delta|$ diagonal elements of the matrix $\Theta_x$ such that $$\Theta_{x_\Delta} = \text{diag}\{P_{\delta_1}, \ldots, P_{\delta_{|\Delta|}}\} \text{ and}$$

denotes the conjugate transpose operation.

It is then possible to particularize the equation (13) relative to the theoretical capacity $c_{\Delta_t}$ for a sub-set S and an ordered part Γ. It can be noted especially that the decoding order follows the order of the groups of Γ since the partition is considered to be ordered, i.e. with a 1 to K order.

Furthermore, in one of the reduced feedback conditions as indicated here above, the power is considered to be fixed and in the absence of knowledge of a channel at transmission, it is equidistributed among all the active transmit antennas.

Thus we have: $\forall i \in S$, $$P_i = \frac{1}{d}$$

and $\forall j \notin S, P_j = 0$ with $d=|S|$ the number of active antennas in the set S.

For this type of receiver, each capacity per stream is classically computed from matrix inversions as in the equation (14).

Consequently, as many matrix inversions sized $N_R \times N_R$ are needed as there are groups in the set S of active antennas (comprising d elements), each inversion having $$O\left(N_R^3 + N_R^2 \left(d - \sum_{p=1}^{i} |\Delta_p|\right)\right)$$

order complexity according to the Landau notation.

Another approach of lower complexity is used to obtain each matrix to be inverted by a recursive method. Thus, a new value $B_{l+1}$ (equation (18) here below) is obtained by updating a previous value $B_l$ (equation (15)) where l is the l+1th decoded group of antennas considered with $0 \leq l < K$:

$$B_l = \left( I_{N_R} + \frac{\rho}{d} \sum_{j=1}^{l} H_{\Delta_j} H_{\Delta_j}^\dagger \right)^{-1} \quad (15)$$

The new value $B_{l+1}$ is then obtained through the matrix inversion lemma also called Woodbury's matrix identity given by the following relationship:

$$(A+UCV)^{-1} = A^{-1} - A^{-1}U(C^{-1}+VA^{-1}U)^{-1}VA^{-1}$$

We then obtain:

$$B_{l+1} = \left( I_{N_R} + \frac{\rho}{d} \sum_{j=1}^{l+1} H_{\Delta_j} H_{\Delta_j}^\dagger \right)^{-1} \quad (16)$$

$$B_{l+1} = \left( I_{N_R} + \frac{\rho}{d} \sum_{j=1}^{l} H_{\Delta_j} H_{\Delta_j}^\dagger + \frac{\rho}{d} H_{\Delta_{l+1}} H_{\Delta_{l+1}}^\dagger \right)^{-1} \quad (17)$$

$$B_{l+1} = B_l - \frac{\rho}{d} B_l H_{\Delta_{l+1}} \left( I_{|\Delta_{l+1}|} + \frac{\rho}{d} H_{\Delta_{l+1}}^\dagger B_l H_{\Delta_{l+1}} \right)^{-1} H_{\Delta_{l+1}}^\dagger B_l \quad (18)$$

The order of complexity is thus reduced and equal to $0(N_R^2|\Delta_l|)$.

The first algorithm described with reference to FIG. 9 can therefore be particularized and rewritten in the form of a second algorithm.

This second simplified algorithm is described especially in appendix B which is an integral part of the present description.

(ii) Second Example

If the system considered has a fixed partition, the first and second algorithms (as well as the algorithms that flow therefrom) can be simplified by searching solely for the optimum decoding order of the fixed partition.

(iii) Third Example

Furthermore, an exhaustive search for the best set of active transmit antennas among the $N_T$ transmit antennas increases exponentially with the number $N_T$ of transmit antennas available.

Consequently, in order to reduce the complexity of this search, various embodiments are proposed.

For example, one of the embodiments relies on an iterative implementation starting from an empty set S. Another embodiment relies on an iterative implementation based on a full set S, i.e. comprising the $N_T$ transmit antennas. Indeed, the losses in performance due to these iterative implementations are negligible. Furthermore, these two embodiments lead to the same selection of the set S.

For example, referring to appendix C which is an integral part of the present description, we present the algorithm for the selection of the transmit antennas jointly with the selection of discrete rates per antenna relying on an iterative embodiment known as an "incremental" embodiment also called a third algorithm. The matrices $A_{\Delta_i}$ are deemed to be known.

More specifically, in this algorithm, the selected transmit antennas, i.e. the antennas chosen as being active, are added one by one to the set S.

Similarly, the algorithm for the selection of the transmit antennas relying on an iterative embodiment known as a "decremental" embodiment i.e. starting with a set S of full transmit antennas comprising the $N_T$ transmit antennas, can be easily obtained from the previous incremental algorithm.

In this case, the transmit antennas are subtracted one by one if the sum capacity of the set containing x antennas is greater than the one containing x+1 antennas.

In particular, in the case of an MMSE receiver combined with a succession of interferences, the way in which the capacities are computed per antenna is similar to that described with reference to the first example, i.e. using a recursive method to obtain inverse matrices.

The algorithm illustrating the implementation of this technique, referred to as the fourth algorithm, is presented especially in appendix D which is an integral part of the present description.

Finally, in order to further reduce the complexity of the iterative algorithms, it may be worthwhile to explore only the optimum ordering or again only the choice of optimum partition at each addition (and respectively at each elimination for the implementation of the decremental iterative embodiment) of a transmit antenna in the set S of the active transmit antennas.

This simplification leads to the elimination, in the third and fourth algorithms presented respectively in appendix C and appendix D, of either the step for searching for the best partition (step denoted 1.2 in the appendices) or the step of searching for the best permutation of the set S (step denoted 1.2.1 in the appendices also called the step for searching for an optimum ordering).

Thus if, for example, it is chosen to eliminate the step of searching for the optimum ordering, a fixed decoding order is dictated by the manner of adding elements to the set S for an incremental type procedure. During a decremental selection, the decoding order is fixed at an initialization step. It may be based for example on a criterion of classification of the SINRs at output of the MMSE before the elimination of interference; the lowest elimination at each iteration is tested.

This simplification however gives rise to a deterioration of performance.

.7 Structures of Transmission and Reception Devices

Figure 4:
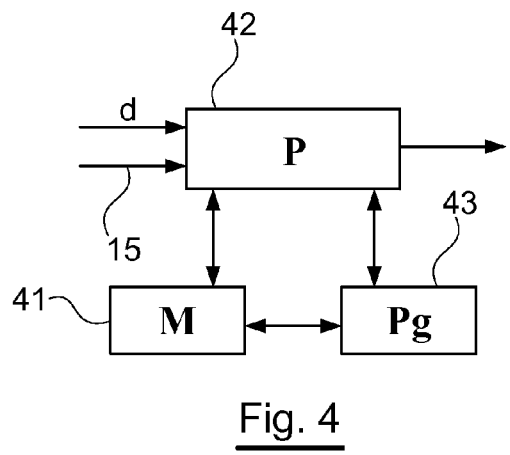
FIGS. 4 and 5 respectively show the structure of a transmit device and a reception device according to a particular embodiment of the invention.
Figure 5:
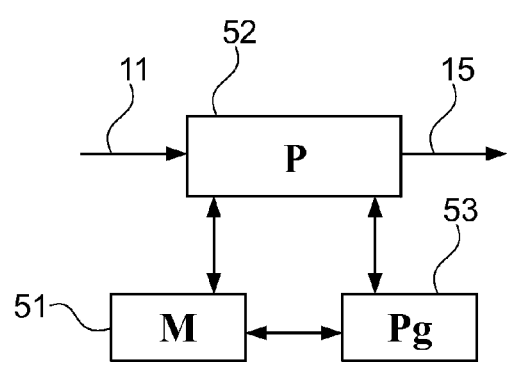
Figure 6:
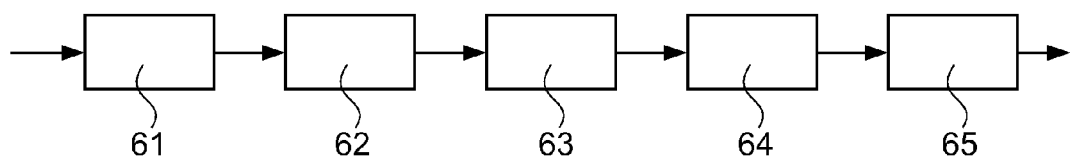
FIG. 6 illustrates the main steps of the S-PARC technique described with reference to the prior art.

Finally, with reference to FIGS. 4 and 5, we present the simplified structures of a transmission device and a reception device respectively implementing a technique for sending and reception as described here above.

A sending device comprises a memory 41 constituted by a buffer memory, a processing unit 42 equipped for example with a microprocessor μP and driven by the computer program 43 implementing the sending method according to an embodiment of the invention.

At initialization, the code instructions of the computer program 43 are loaded for example into a RAM and then executed by the processor of the processing unit 42. At input, the processing unit 42 receives a bit stream d and a parameterizing signal 15, for example in the form of a CQI message. The microprocessor of the processing unit 42 implements the steps of the sending method described here above, according to the instructions of the computer program 43, to adapt the per group distribution of the transmit antennas and allocate specific rates to each of the groups as a function of the available rates in transmission, so as to optimize the transmission performance.

To this end, the transmission device comprises means for receiving a parameterizing signal transmitted by said receiver, means for selecting one of the distributions defined in the parameterizing signal, means for distributing the transmit antennas according to the groups of the selected distribution and means for assigning each of the groups the corresponding specific rate, defined in the parameterizing signal.

These means are driven by the processing unit 42

The receiver device also comprises a memory 51, a processing unit 52 equipped for example with a microprocessor μP and driven by the computer program 53 implementing the reception method according to an embodiment of the invention.

At initialization, the code instructions of the computer program 53 are loaded for example into a RAM and then executed by the processor of the processing unit 52. At input, the processing unit 52 receives a received signal 11. The microprocessor of the processing unit 52 implements the steps of the reception method described here above, according to the instructions of the computer program 53, to analyze the received signal and determine a parameterizing signal 15 defining at least one distribution of the transmit antennas in groups and specific rates allocated respectively to each of the groups of antennas for each distribution, as a function of a piece of information representing the transmission channel.

To this end, the reception device comprises means for analyzing the received signal, delivering a piece of information representing the transmission channel, means for determining, as a function of the information representing the transmission channel:

at least one distribution of said transmit antennas into groups of antennas;

specific rates allocated respectively to each of said groups of antennas, for each distribution and means for transmitting a parameterizing signal to the transmitter defining the distribution or distributions and the specific rates.

1.8 Appendix A

Inputs:  a. information on the quality of the channel
b. set of discrete rates

Initialization $R_{max} = 0$;

for each Combination i having as a subset $S_i \subseteq \{1, \ldots, N_T\}$ do
    for each ordered partition $\Gamma_j$ of $S_i$ possessing K groups $\{\Delta_1, \ldots, \Delta_K\}$
    do
        1. Compute $A_{\Delta_t}$ values, according to the receiver considered, for each group of antennas $\Delta_t$, t = 1 to K
        2. Compute corresponding capacities $c_{\Delta_t} = \log_2(I_{|\Delta_t|} + A_{\Delta_t})$ 3. Allocate discrete rates
$$R_{i,j} = \bigcup_{t=1}^{K} \{\lfloor c_{\Delta_t} \rfloor\}$$

-continued

→ obtain discrete sum capacity $$T_{i,j} = \sum_{t=1}^{K} \lfloor c_{\Delta_t} \rfloor$$

4. Comparison: $T_{i,j} > R_{max}$?
    5. if condition verified then
      $R_{max} = T_{i,j}$
      $R = R_{i,j}$
      $S = S_i$
      $\Gamma = \Gamma_j$
Outputs: a. S the set of selected antennas
    b. R the ordered set of corresponding rates
    c. $\Gamma$ the chosen ordered partition

1.9 Appendix B

Inputs: a. information on the quality of the channel
   b. set of discrete rates
Initialization $R_{max} = 0$;
for each Combination i having as a subset of d elements $S_i \subseteq \{1, \ldots, N_T\}$ do
  for each ordered partition $\Gamma_j$ of $S_i$ possessing K groups $\{\Delta_1, \ldots, \Delta_K\}$
  do
    $T_{i,j} = 0$
    $R_{i,j} = \emptyset$
    $B = I_{N_R}$
    for each group $\Delta_t$, t = K to 1 do $$A_{\Delta_t} = \frac{\rho}{d} H_{\Delta_t}^\dagger B H_{\Delta_t}$$

$$c_{\Delta_t} = \log_2 \det(I_{|\Delta_t|} + A_{\Delta_t})$$

$$B = B - \frac{\rho}{d} B H_{\Delta_t} (I_{|\Delta_t|} + A_{\Delta_t})^{-1} H_{\Delta_t}^\dagger B$$

$$T_{i,j} = T_{i,j} + \lfloor c_{\Delta_t} \rfloor$$

$$R_{i,j} = R_{i,j} \cup \{\lfloor c_{\Delta_t} \rfloor\}$$

Comparison: $T_{i,j} > R_{max}$ ?
    if condition verified then
      $R_{max} = T_{i,j}$
      $R = R_{i,j}$
      $S = S_i$
      $\Gamma = \Gamma_j$
Outputs: a. S the set of selected antennas
    b. R the ordered set of corresponding rates
    c. $\Gamma$ the chosen ordered partition

1.10 Appendix C

Inputs: a. information on the quality of the channel
    b. set of discrete rates
Initialization $R_{max} = 0$
      $S = \emptyset$
For n = 1 to $N_T$ do
  1. for each element i of $\overline{S}$ do
    1.1 Test the set $S_i = S \cup \{i\}$
    1.2 for each Partition $\Gamma_j$ of $S_i$ do
      1.2.1. for each Permutation of the groups of $\Gamma_j$ giving the partition $\Gamma_{j,p}$
      possessing K groups $\{\Delta_1, \ldots, \Delta_K\}$ do
        1.2.1.1. Compute $A_{\Delta_t}$ values according to the receiver
        considered for each group of antennas $\Delta_t$, t = 1 to K
        1.2.1.2. Compute corresponding capacities
        $c_{\Delta_t} = \log_2 \det(I_{|\Delta_t|} + A_{\Delta_t})$ 1.2.1.3. Allocate discreterates rates $$R_{i,j,p} = \bigcup_{t=1}^{K} \{\lfloor c_{\Delta_t} \rfloor\}$$

→ obtain discrete sum capacity $T_{i,j,p} = \sum_{t=1}^{K} \lfloor c_{\Delta_t} \rfloor$ 2. Find: [I, J, P] such that $[I, J, P] = \arg\max_{i,j,p} T_{i,j,p}$ 3. Compare: $T_{I,J,P} > R_{max}$ ?
4. if condition verified then
    $R_{max} = T_{I,J,P}$
    $R = R_{I,J,P}$
    $S = S_I$
    $\Gamma = \Gamma_{J,P}$
else
    Output
Outputs:  a. S the set of selected antennas
    b. R the ordered set of corresponding rates
    c. Γ the chosen ordered partition

1.11 Appendix D

Inputs:  a. information on the quality of the channel
    b. set of discrete rates
Initialization $R_{max} = 0$
    $S = \emptyset$
For n = 1 to $N_T$ do
  1. for each element i of $\bar{S}$ do
    1.1. Test the set $S_i = S \cup \{i\}$
    1.2. for each Partition $\Gamma_j$ of $S_i$ do
      1.2.1. for each Permutation of the groups of $\Gamma_j$ giving the partition
      $\Gamma_{j,p}$ possessing K groups $\{\Delta_1, \ldots, \Delta_K\}$ do
        $T_{i,j,p} = 0$
        $R_{i,j,p} = \emptyset$
        $B = I_{N_R}$
        for each group $\Delta_t$, t = K to 1 do $$A_{\Delta_t} = \frac{\rho}{n} H^{\dagger}_{\Delta_t} B H_{\Delta_t}$$

$$c_{\Delta_t} = \log_2 \det(I_{|\Delta_t|} + A_{\Delta_t})$$

$$B = B - \frac{\rho}{n} B H_{\Delta_t} (I_{|\Delta_t|} + A_{\Delta_t})^{-1} H^{\dagger}_{\Delta_t} B$$

$T_{i,j,p} = T_{i,j,p} = \lfloor c_{\Delta_t} \rfloor$
$R_{i,j,p} = R_{i,j,p} \cup \{\lfloor c_{\Delta_t} \rfloor\}$ 2. Find: [I, J, P] such that $[I, J, P] = \arg\max_{i,j,p} T_{i,j,p}$ 3. Compare: $T_{I,J,P} > R_{max}$ ?

4. if condition verified then
    $R_{max} = T_{I,J,P}$
    $R = T_{I,J,P}$
    $S = S_I$
    $\Gamma = \Gamma_{J,P}$
else
    Output
Outputs:  a. S the set of selected antennas
    b. R the ordered set of corresponding rates
    c. Γ the chosen ordered partition

1.12 Conclusion

Although the present disclosure has been described with reference to one or more examples, workers skilled in the art will recognize that changes may be made in form and detail without departing from the scope of the disclosure and/or the appended claims.

The invention claimed is:

1. A method for receiving a signal, named a received signal, corresponding to a data signal sent out by a transmitter to a receiver through a transmission channel, said transmitter comprising $N_T$ transmit antennas and said receiver comprising $N_R$ receive antennas, with $N_T$ and $N_R$ being greater than or equal to 2, wherein the method comprises the following steps:

analyzing said received signal, delivering a piece of information representing said transmission channel;

determining periodically and/or as a function of a variation of said transmission channel:
- at least one distribution of said transmit antennas into at least one group as a function of said piece of information representing the transmission channel, each group comprising at least one of the transmit antennas, wherein at least one of said at least one group comprises at least two of the transmit antennas as a result of at least one of said determining steps;
- specific rates allocated respectively to each of said groups of transmit antennas for each distribution as a function of said piece of information representing the transmission channel; and transmitting to said transmitter a parameterizing signal defining said at least one distribution and said specific rates;

wherein, in the determining step, an optimized ordered distribution $\Gamma^*$, the specific rates per group $R^*$ for this distribution, and an optimized set $S^*$ of the active antennas are determined from the following equations:

$$(S^*, \Gamma^*) = \arg\max_{S,\Gamma} T_{S,\Gamma}$$

$$R^* = \bigcup_{i=1}^{K} \{r^*_{\Delta_i}(S^*, \Gamma^*)\}$$

with:

$$T_{S,\Gamma} = \sum_{i=1}^{K} r^*_{\Delta_i}(S, \Gamma);$$

$$r^*_{\Delta_i}(S, \Gamma) = \arg\min_{r_{\Delta_i} \in J_{|\Delta_i|}} (c_{\Delta_i} - r_{\Delta_i})$$

such that $r^*_{\Delta_i}(S, \Gamma) \leq c_{\Delta_i}$;

$$c_{\Delta_i} = \log_2 \det(I_{|\Delta_i|} + A_{\Delta_i}(P_1, \ldots, P_{N_T}, H, \rho));$$

where:
H represents said transmission channel;
$\rho$ corresponds to signal-to-noise-ratio;
$\{P_1, \ldots, P_{N_T}\}$ corresponds to a set of transmission power values assigned to each transmit antenna;
$J_{|\Delta|}$ corresponds to a set of discrete rates available at transmission;
$\Delta$ corresponds to a group included in the distribution $\Gamma$;
$A_\Delta$ is a matrix representing said receiver.

2. The method according to claim 1, wherein said steps of analyzing and transmitting are also implemented periodically and/or as a function of a variation of said transmission channel.

3. The method according to claim 1, wherein said determining step determines specific power values respectively allocated to each of said transmit antennas, and said parameterization signal also defines these power values.

4. The method according to claim 1, wherein the method comprises a step of selecting transmit antennas from among said $N_T$ transmit antennas, called active antennas, at least as a function of said piece of information representing the transmission channel,
and wherein said parameterizing signal defines said active antennas.

5. The method according to claim 4, wherein said selection step is implemented jointly with said determining step.

6. The method according to claim 1, wherein at least one distribution is determined by taking account of at least one of the elements belonging to the group comprising:
discrete rates available at transmission;
power values associated with each distribution into groups of said transmit antennas;
a decoding order implemented at the receiver side;
the number $N_R$ of receive antennas;
a number of the transmit antennas that are active.

7. The method according to claim 1, wherein the method implements a step of determining an ordering of said groups and a decoding step implemented successively for each group following said ordering.

8. The method according to claim 7, wherein said ordering step minimizes a metric taking account of the distributions into groups of said transmit antennas and/or power values given by said transmit antennas and/or specific rates and/or a decoding order.

9. A device for receiving a signal, named a received signal, corresponding to a data signal sent out by a transmitter to a receiver through a transmission channel, said transmitter comprising $N_T$ transmit antennas and said receiver comprising $N_R$ receive antennas, with $N_T$ and $N_R$ being greater than or equal to 2, wherein the device comprises:
means for analyzing said received signal, delivering a piece of information representing said transmission channel;
means for determining periodically and/or as a function of a variation of said transmission channel:
- at least one distribution of said transmit antennas into at least one group as a function of said piece of information representing the transmission channel, each group comprising at least one of the transmit antennas, wherein at least one of said at least one group comprises at least two of the transmit antennas as a result of at least one determining operations;
- specific rates allocated respectively to each of said groups of transmit antennas for each distribution as a function of said piece of information representing the transmission channel; and means for transmitting to said transmitter a parameterizing signal defining said at least one distribution and said specific rates;

wherein the means for determining determines an optimized ordered distribution $\Gamma^*$, the specific rates per group $R^*$ for this distribution, and an optimized set $S^*$ of the active antennas from the following equations:

$$(S^*, \Gamma^*) = \arg\max_{S,\Gamma} T_{S,\Gamma}$$

$$R^* = \bigcup_{i=1}^{K} \{r^*_{\Delta_i}(S^*, \Gamma^*)\}$$

with:

$$T_{S,\Gamma} = \sum_{i=1}^{K} r^*_{\Delta_i}(S, \Gamma);$$

$$r^*_{\Delta_i} = (S, \Gamma) = \arg\min_{r_{\Delta_i} \in J_{|\Delta_i|}} (c_{\Delta_i} - r_{\Delta_i})$$

such that $r^*_{\Delta_i}(S, \Gamma) \leq c_{\Delta_i}$;

-continued $$c_{\Delta_i} = \log_2 \det(I_{|\Delta_i|} + A_{\Delta_i}(P_1, \ldots, P_{N_T}, H, \rho));$$

where:
H represents said transmission channel;
ρ corresponds to signal-to-noise-ratio;
$\{P_1, \ldots, P_{N_T}\}$ corresponds to a set of transmission power values assigned to each transmit antenna;
$J_{|\Delta|}$ corresponds to a set of discrete rates available at transmission;
Δ corresponds to a group included in the distribution Γ;
$A_\Delta$ is a matrix representing said receiver.

10. A non-transitory computer-readable medium comprising a computer program product stored thereon and executable by a processor, wherein the computer program product comprises program code instructions for implementing a method of receiving a signal, named a received signal, corresponding to a data signal sent out by a transmitter to a receiver through a transmission channel, when executed by the processor, said transmitter comprising $N_T$ transmit antennas and said receiver comprising $N_R$ receive antennas, with $N_T$ and $N_R$ being greater than or equal to 2, wherein the method comprises the following steps:
analyzing said received signal, delivering a piece of information representing said transmission channel;
determining periodically and/or as a function of a variation of said transmission channel:
at least one distribution of said transmit antennas into at least one group as a function of said piece of information representing the transmission channel, each group comprising at least one of the transmit antennas, wherein at least one of said at least one group comprises at least two of the transmit antennas as a result of at least one of said determining steps;
specific rates allocated respectively to each of said groups of transmit antennas for each distribution as a function of said piece of information representing the transmission channel; and
transmitting to said transmitter a parameterizing signal defining said at least one distribution and said specific rates;
wherein, in the determining step, the processor determines an optimized ordered distribution Γ*, the specific rates per group R* for this distribution, and an optimized set S* of the active antennas from the following equations:

$$(S^*, \Gamma^*) = \underset{S, \Gamma}{\arg\max}\, T_{S, \Gamma}$$

$$R^* = \bigcup_{i=1}^{K} \{r^*_{\Delta_i}(S^*, \Gamma^*)\}$$

with:

$$T_{S, \Gamma} = \sum_{i=1}^{K} r^*_{\Delta_i}(S, \Gamma);$$

$$r^*_{\Delta_i}(S, \Gamma) = \arg\min_{r_{\Delta_i} \in J_{|\Delta_i|}} (c_{\Delta_i} - r_{\Delta_i})$$

such that $r^*_{\Delta_i}(S, \Gamma) \leq c_{\Delta_i}$;

$$c_{\Delta_i} = \log_2 \det(I_{|\Delta_i|} + A_{\Delta_i}(P_1, \ldots, P_{N_T}, H, \rho));$$

where:
H represents said transmission channel;
ρ corresponds to signal-to-noise-ratio;
$\{P_1, \ldots, P_{N_T}\}$ corresponds to a set of transmission power values assigned to each transmit antenna;
$J_{|\Delta|}$ corresponds to a set of discrete rates available at transmission;
Δ corresponds to a group included in the distribution Γ;
$A_\Delta$ is a matrix representing said receiver.

11. A method comprising:
transmitting a signal for parameterizing a transmitter, transmitted from a receiver to said transmitter through a transmission channel, said transmitter comprising $N_T$ transmit antennas and said receiver comprising $N_R$ receive antennas, with $N_T$ and $N_R$ being greater than or equal to 2, wherein the signal comprises at least one parameterizing field comprising:
a piece of information relating to at least one distribution of said transmit antennas into at least one group; and
a piece of information relating to specific rates allocated respectively to each of said groups of transmit antennas, for each distribution;
obtained, as a function of a piece of information representing the transmission channel, by a periodic determination and/or a determination as a function of a variation of the transmission channel, wherein an optimized ordered distribution Γ*, the specific rates per group R* for this distribution, and an optimized set S* of the active antennas are determined from the following equations:

$$(S^*, \Gamma^*) = \underset{S, \Gamma}{\arg\max}\, T_{S, \Gamma}$$

$$R^* = \bigcup_{i=1}^{K} \{r^*_{\Delta_i}(S^*, \Gamma^*)\}$$

with:

$$T_{S, \Gamma} = \sum_{i=1}^{K} r^*_{\Delta_i}(S, \Gamma);$$

$$r^*_{\Delta_i}(S, \Gamma) = \arg\min_{r_{\Delta_i} \in J_{|\Delta_i|}} (c_{\Delta_i} - r_{\Delta_i})$$

such that $r^*_{\Delta_i}(S, \Gamma) \leq c_{\Delta_i}$;

$$c_{\Delta_i} = \log_2 \det(I_{|\Delta_i|} + A_{\Delta_i}(P_1, \ldots, P_{N_T}, H, \rho));$$

where:
H represents said transmission channel;
ρ corresponds to signal-to-noise-ratio;
$\{P_1, \ldots, P_{N_T}\}$ corresponds to a set of transmission power values assigned to each transmit antenna;
$J_{|\Delta|}$ corresponds to a set of discrete rates available at transmission;
Δ corresponds to a group included in the distribution Γ;
$A_\Delta$ is a matrix representing said receiver; and
wherein each group comprises at least one of the transmit antennas, and wherein at least one of said at least one group comprises at least two transmit antennas as a result of at least one determination.

* * * * *

UNITED STATES PATENT AND TRADEMARK OFFICE
CERTIFICATE OF CORRECTION

PATENT NO.         : 8,412,114 B2
APPLICATION NO.  : 12/441057
DATED              : April 2, 2013
INVENTOR(S)        : Visoz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this
First Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,412,114 B2
APPLICATION NO. : 12/441057
DATED : April 2, 2013
INVENTOR(S) : Raphael Visoz et al.

It is certified that error appears in the above-identified patent and that said Letters Patent is hereby corrected as shown below:

On Title page 1, item (56) in the References Cited, FOREIGN PATENT DOCUMENTS, insert therefor --WO 200203568 A1 01/2002--.

In the Specification

In column 17, line 44, delete "$\Delta_i \cap \Delta = \emptyset$" therefor -- $\Delta_i \cap \Delta_j = \emptyset$ --.

Signed and Sealed this
Twenty-fourth Day of May, 2016

Michelle K. Lee
*Director of the United States Patent and Trademark Office*